United States Patent Office 3,234,573
Patented Feb. 15, 1966

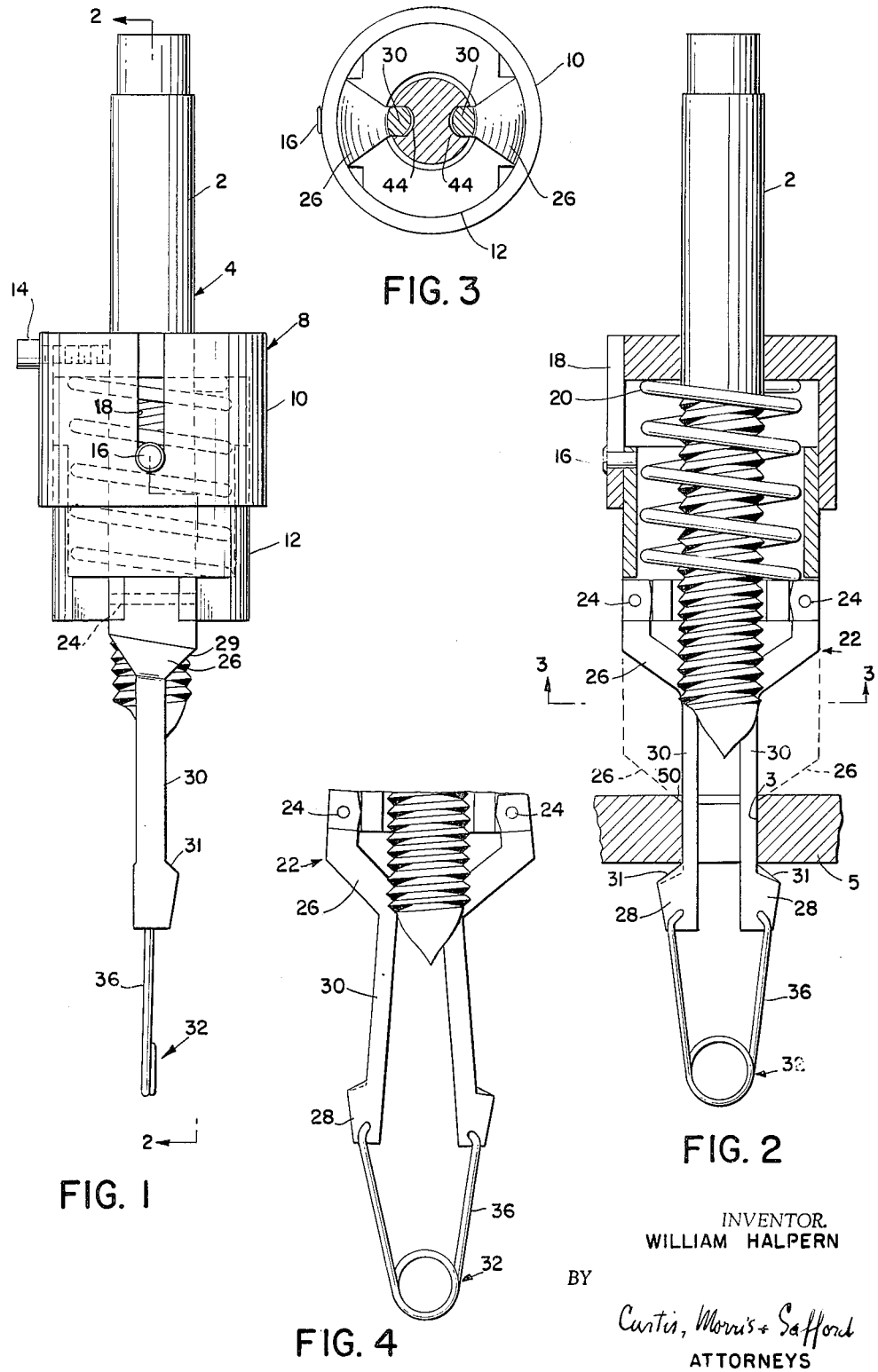

3,234,573
DEBURRING TOOL IN COMBINATION WITH
TAPPING TOOL AND THE LIKE
William Halpern, Haviland Road, Harrison, N.Y.
Filed Mar. 12, 1964, Ser. No. 351,424
6 Claims. (Cl. 10—140)

This invention relates to deburring the ends of holes
in metal, and more in particular to removing the burrs
from both ends of a hole at the end of a tapping or threading operation.

An object of this invention is to provide an improved
method and means for automatically removing the burrs
from the two ends of a hole. Another object is to provide improved means for deburring an inaccessible end
of a hole. A further object is to provide improved deburring means for use with tapping tools and the like.
A further object is to provide an improved tool which taps
the hole and deburrs both ends of a hole. A still further
object is to provide for the above with apparatus which is
simple and relatively inexpensive, and which is adaptable
to various conditions of operation and use. These and
other objects will be in part obvious and in part pointed
out below.

In the drawings:

FIGURE 1 is a side elevation of one embodiment of the
invention;

FIGURE 2 is a sectional view on the line 2—2 of FIGURE 1 with the tool engaged with a work piece;

FIGURE 3 is a sectional view on the line 3—3 of FIGURE 2; and,

FIGURE 4 is a view similar to the lower portion of
FIGURE 2 showing the deburring arms when the tool is
disengaged from a work piece.

Referring to FIGURE 1 of the drawings, the top shank
2 of a spiral, pointed, two-fluted tap 4 is mounted in a
tapping attachment 6 which is so arranged so as to rotate
the tap clockwise when pressure is exerted downwardly.
That pressure and rotation act to cause the tap to produce
a thread in a hole 3 in a work piece, illustratively, a metal
plate 5. When the tapping operation has been completed,
the downward pressure is removed and upward pressure
is exerted on the tapping attachment, and the upward pressure reverses the rotation of tap 4 and turns it from the
hole.

Mounted upon tap 4 is a deburring unit 8 which, as will
be explained below, acts automatically at the end of the
tapping operation to remove the burrs from the top and
bottom of the tapped hole. Unit 8 has a pair of telescoping sleeves 10 and 12, sleeve 10 being the cylindrical side
wall of an inverted cup which has an annular top wall
13 which fits shank 2 and is clamped thereto by a set
screw 14. Sleeve 12 has its upper end telescoped into
sleeve 10 and may slide axially of sleeve 10 and tap 4 within the limits of a stop arrangement formed by a headed
screw-pin 16 (see also FIGURE 2) rigidly mounted in
sleeve 12 and slidable in a slot 18 in sleeve 10. Sleeves
10 and 12 provide an enclosure for a compression spring
20 which urges the sleeves to the expanded position shown
in the drawings, but sleeve 12 may be telescoped into
sleeve 10 against the action of spring 20.

Rockably mounted upon the bottom of sleeve 12 are
two elongated deburring elements 22 which are diametrically spaced on the sleeve and pivoted on pivot pins 24.
Each of the deburring elements 22 has a top deburring
portion or element 26, a bottom deburring portion or element 28, and, a central leg portion 30. Leg portions 30
are somewhat oval in cross-section and the legs are
adapted to extend longitudinally through the hole 3 in the
work piece. Each of the upper deburring elements 26
(See FIGURES 1 and 3) has a cutting edge 29 which is
a trailing edge during the tapping operation. However,
when the rotation is reversed to remove the tap, cutting
edges 29 act to perform a deburring and chamfering operation, as will be discussed more fully below. Similarly,
each of the bottom deburring elements 28 has a cutting
edge 31 which is also a trailing edge during the tapping
operation.

The lower ends of the deburring elements are biased
or urged apart by a coil spring 32 which has a coil portion 34 and a pair of arms 36, the ends 38 of which extend
through holes in the ends of the deburring elements.
However, the outward and inward swinging movements
of the deburring elements are limited to the positions
shown in FIGURES 4 and 2, respectively, by stops on
sleeve 12 at the top of the deburring elements. As the
deburring elements swing outwardly between the positions of FIGURES 2 and 4, their extreme upper ends
engage surfaces 40; and, as the deburring elements swing
inwardly, they engage surfaces 42.

Tap 4 has two flutes (see FIGURE 3) 44 which are
diametrically positioned and have concave bottom and
parallel side surfaces. The upper ends of the legs 30 of
the deburring elements 22 are positioned respectively in
these flutes. It has been pointed out above that the deburring elements are mounted upon sleeve 12 which may
slide axially with respect to sleeve 10, but that the sleeves
are mounted in a fixed angular relationship with respect
to the tap, so that the sleeves and the deburring elements
rotate with the tap. That rotary movement is aided by
the interfitting relationship between the flutes in the tap
and the deburring elements.

Referring now to FIGURE 2, it is assumed that hole
3 in the work piece 5 is to be tapped and that the hole
is then to be deburred from both the top and the bottom
surfaces of the work piece. As the tap is rotated clockwise and moved downwardly toward hole 3, the coil
portion of the spring 32 moves into the hole and the spring
arms 36 engage the side of the hole, thus to move the
spring arms and the bottom ends of the deburring elements together and guide them through the hole. The
bottom tapping portions 28 are shown after they have
emerged from the bottom of the hole and have been
moved apart by spring 32, the arms 30 are resting against
the opposite side walls of the hole. As the downward
movement continues, the tapping operation is started.
However, when the deburring portions 26 of the deburring elements move against the top of the hole, the downward movement of the deburring unit is arrested. Deburring elements 26 slide around the top of hole 3, but
the trailing relationship of the cutting edges 29 prevents
a cutting action. Sleeve 10 continues to move downwardly and telescopes around sleeve 12, and this compresses
spring 20.

When the tapping operation has been completed, the
rotation of the tap is reversed so as to thread the tap from
the hole. At this time, spring 20 is compressed and is
urging the deburring portions 26 against the top of the
hole. Therefore, the reverse rotation causes cutting edges
29 of the deburring portions 26 to deburr the top of the
hole and to produce a chamfer, as indicated at 50, with
the upper deburring elements advancing to the position
indicated in broken lines. The upward movement of the
tap causes a gradual releasing of the compression of
spring 20 so that the cutting edges 29 are withdrawn from
engagement with the work piece.

Upon further upward movement, the deburring elements
are drawn upwardly so that the bottom deburring portions
28 move to the position of FIGURE 2 wherein their cutting edges 31 engage the work piece at the bottom of
hole 3. The reverse rotation causes cutting edges to become effective to remove the burr and produce a chamfer at the bottom of the hole. The angle of cutting edges 31 is of the order of 65° from the axis so as to produce a corresponding chamfer. This angle is such with respect to the force of spring 32 and the forces drawing the deburring portions upwardly, that the chamfer surfaces and the cutting edges act as cam surfaces and move the bottom deburring portions radially inwardly against the biasing action of spring 32. Hence, the bottom deburring portions perform their deburring and chamfering functions at the bottom end of hole 3, and then they move upwardly through the hole and free of the work piece.

In actual operation with an assembly of the type and relative dimensions shown in the drawings, the tapping and deburring operations have been carried on in an efficient and dependable manner. During the downward movement with such operations, spring 32 performs the dual function of urging the deburring elements apart and yet guiding them through the hole in the work piece. During the upward movement, spring 32 performs the important function of holding the bottom deburring portions in operating relationship until the desirable deburring and chamfering has been accomplished; and, then the spring is collapsed by the cam action of the cutting edges 31. During the entire operation the legs 30 and the deburring elements slide freely in the flutes in the tap, and this interengaging relationship provides the driving forces for performing the deburring and chamfering.

The invention contemplates that other structures and modifications may be used to accomplish some or all of the important funtions of the illustrative embodiment of the invention. Under some circumstances, a coil-type compression spring may be positioned between deburring portions 28. Also, the deburring elements may be constructed with inherent resiliency so that they are not rockably mounted at the top.

As many possible embodiments may be made of the apparatus of the above invention and as the art herein described might be varied in various parts, all without departing from the scope of the invention, it is to be understood that all matter hereinabove set forth, or shown in the accompanying drawings is to be interpreted as illustrative and not in a limiting sense.

I claim:

1. In apparatus of the character described, a combined tool comprising, a rotary cutting tool which has flutes and is adapted to remove material from a hole in a work piece and to form burrs on the work piece at the ends of the hole, a unit mounted upon said tool and comprising deburring and chamfering means and mounting means therefor, said mounting means comprising means rigidly mounted upon said tool and movable means including a compression spring, said deburring and chamfering means comprising a pair of deburring and chamfering elements swingably mounted upon said movable means, each of said deburring and chamfering elements comprising a longitudinal portion adapted to be positioned within the hole in the work piece and a pair of cutter portions integral respectively with the ends of said longitudinal portion, each of said cutter portions presenting a cutting edge which is adapted to contact the work piece at the adjacent end of the hole and to perform the deburring and chamfering operation, said deburring and chamfering elements having portions positioned respectively in said flutes thereby to provide a driving relationship between said tool and said elements, and, said apparatus including means resiliently urging said deburring and chamfering elements apart.

2. Apparatus as described in claim 1 wherein said means resiliently urging said elements apart is a spring having a coil portion and a pair of arms connected respectively to the ends of said elements.

3. Apparatus as described in claim 2 which includes separate pivot means connecting said elements to said movable means.

4. Apparatus as described in claim 3 wherein said movable means comprises a cylindrical member which is slidable longitudinally of the tool, and a coil spring surrounding the tool within said movable means.

5. Apparatus as described in claim 4 wherein stops are provided between said movable means and each of said elements to limit the swinging movement.

6. Apparatus as described in claim 5 wherein said tool is a tap and wherein said cutting edges are straight edges at substantially 45° to the axis of the tap.

References Cited by the Examiner
UNITED STATES PATENTS

| | | | |
|---|---|---|---|
| 1,101,157 | 6/1914 | Wilberg | 145—125 |
| 2,847,884 | 8/1958 | Favre et al. | 77—73.5 X |
| 2,949,618 | 8/1960 | Peyser et al. | 10—140 |

ANDREW R. JUHASZ, *Primary Examiner.*